(12) United States Patent
Umimura (10) Patent No.: US 11,843,310 B2
(45) Date of Patent: Dec. 12, 2023

(54) VOLTAGE CONVERSION CIRCUIT AND IMAGE FORMING APPARATUS

(71) Applicant: CANON KABUSHIKI KAISHA, Tokyo (JP)

(72) Inventor: Kiyokazu Umimura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 480 days.

(21) Appl. No.: 17/137,552

(22) Filed: Dec. 30, 2020

(65) Prior Publication Data
US 2021/0211552 A1 Jul. 8, 2021

(30) Foreign Application Priority Data
Jan. 7, 2020 (JP) .................................. 2020-000690

(51) Int. Cl.
*H02M 1/00* (2006.01)
*H02M 1/12* (2006.01)
*H02M 3/158* (2006.01)

(52) U.S. Cl.
CPC ......... *H02M 1/0045* (2021.05); *H02M 1/126* (2013.01); *H02M 3/158* (2013.01)

(58) Field of Classification Search
CPC .... H02M 1/0045; H02M 1/126; H02M 3/158; H02M 1/007
See application file for complete search history.

(56) References Cited

U.S. PATENT DOCUMENTS

| 2015/0181066 A1 | 6/2015 | Miura |
| 2017/0242448 A1 | 8/2017 | Wong |
| 2020/0073425 A1* | 3/2020 | Wang .................... H02M 3/158 |

FOREIGN PATENT DOCUMENTS

| CN | 109544893 A | * | 3/2019 |
| CN | 115411831 A | * | 11/2022 |
| JP | H0669678 A | | 3/1994 |
| JP | 2005303280 A | | 10/2005 |
| JP | 2007094970 A | | 4/2007 |
| JP | 2007195310 A | | 8/2007 |
| JP | 2014168153 A | * | 9/2014 |
| JP | 2015126257 A | | 7/2015 |

OTHER PUBLICATIONS

Analog Devices, LT1762 Series Data Sheet (Year: 2018).*

* cited by examiner

*Primary Examiner* — Christopher E Mahoney
(74) *Attorney, Agent, or Firm* — ROSSI, KIMMS & McDOWELL LLP (57) ABSTRACT

In order to eliminate inconvenience that the voltage accuracy requirement for a power supply voltage of an ASIC cannot be satisfied because noise generated inside a substrate is superimposed on the power supply voltage, an LDO and an LC filter are added between a DC-DC converter and a power supply terminal of the ASIC to reduce the noise superimposed on the power supply voltage, the LDO is added to the subsequent stage of the DC-DC converter to reduce noise generated from the DC-DC converter, and further the LC filter is added to the subsequent stage of the LDO to reduce noise generated due to crosstalk or the like.

8 Claims, 7 Drawing Sheets

VOLTAGE CONVERSION CIRCUIT AND IMAGE FORMING APPARATUS

BACKGROUND OF THE INVENTION

Field of the Invention

The present invention relates to a voltage conversion circuit that supplies DC (direct current) power supply to an electronic circuit constituting an image forming apparatus, and an image forming apparatus that is equipped with the voltage conversion circuit.

Description of the Related Art

In recent years, as for electronic circuits such as a CPU (central processing unit), an ASIC (application specific integrated circuit) and the like used in an image forming apparatus, semiconductor processes have become finer, so that operation voltages of DC power supplies have dropped. As the operation voltage has dropped, an operation voltage range becomes narrow, so that voltage accuracy required for power supply voltage increases. For this reason, in order to satisfy voltage accuracy required for the electronic circuit, a DC-DC converter or an LDO (Low Drop-Out) is arranged in the vicinity of a power supply terminal of the electronic circuit and power is supplied.

On the other hand, as a factor that hinders from increasing the voltage accuracy require for the power supply voltage, there is noise due to a ripple caused during an operation of a power supply circuit. Namely, when the noise is superimposed on the power supply, the power supply cannot satisfy an operation voltage range that is required by the electronic circuit. When the power supply of the electronic circuit cannot satisfy the operation voltage range, there is a possibility that the electronic circuit does not operate normally.

In order to reduce the noise that is superimposed on the power supply voltage, there is a method of connecting a low-pass filter (i.e., an LC (inductor-capacitor) filter) to power supply that is input from an external terminal and thereafter generating a required power supply voltage by the LDO (for example, refer to Japanese Patent Application Laid-Open No. H06-69678).

By connecting the low-pass filter to the external terminal as shown in Japanese Patent Application Laid-Open No. H06-69678, it is possible to remove a noise component that has been superimposed on the power supply voltage applied from the outside. However, in this method, when high-frequency noise due to crosstalk or the like generated inside a substrate is superimposed on the power supply voltage, it is impossible to remove the relevant high-frequency noise.

The present invention aims to provide the power supply circuit of the electronic circuit that constitutes the image forming apparatus. More specifically, the present invention aims to reduce operation noise of the power supply circuit being superimposed on a power supply line, reduce the high-frequency noise due to the crosstalk generated inside the substrate, and thus satisfy the voltage accuracy required for the power supply of the electronic circuit.

SUMMARY OF THE INVENTION

The present invention is characterized by a voltage conversion circuit for supplying power supply to an electronic circuit, wherein a DC-DC converter configured to perform voltage conversion for DC power supply, an LDO configured to step down and to remove a ripple, and a low-pass filter configured to reduce noise are connected in series.

According to the voltage conversion circuit of the present invention, it is possible to reduce operation noise of a power supply circuit being superimposed on a power supply line, reduce high-frequency noise due to crosstalk generated inside a substrate, and thus satisfy voltage accuracy required for the power supply of the electronic circuit.

Further features of the present invention will become apparent from the following description of exemplary embodiments with reference to the attached drawings.

DESCRIPTION OF THE EMBODIMENTS

First Embodiment

Hereinafter, an embodiment for carrying out the present invention will be described with reference to the attached drawings.

Figure 1:
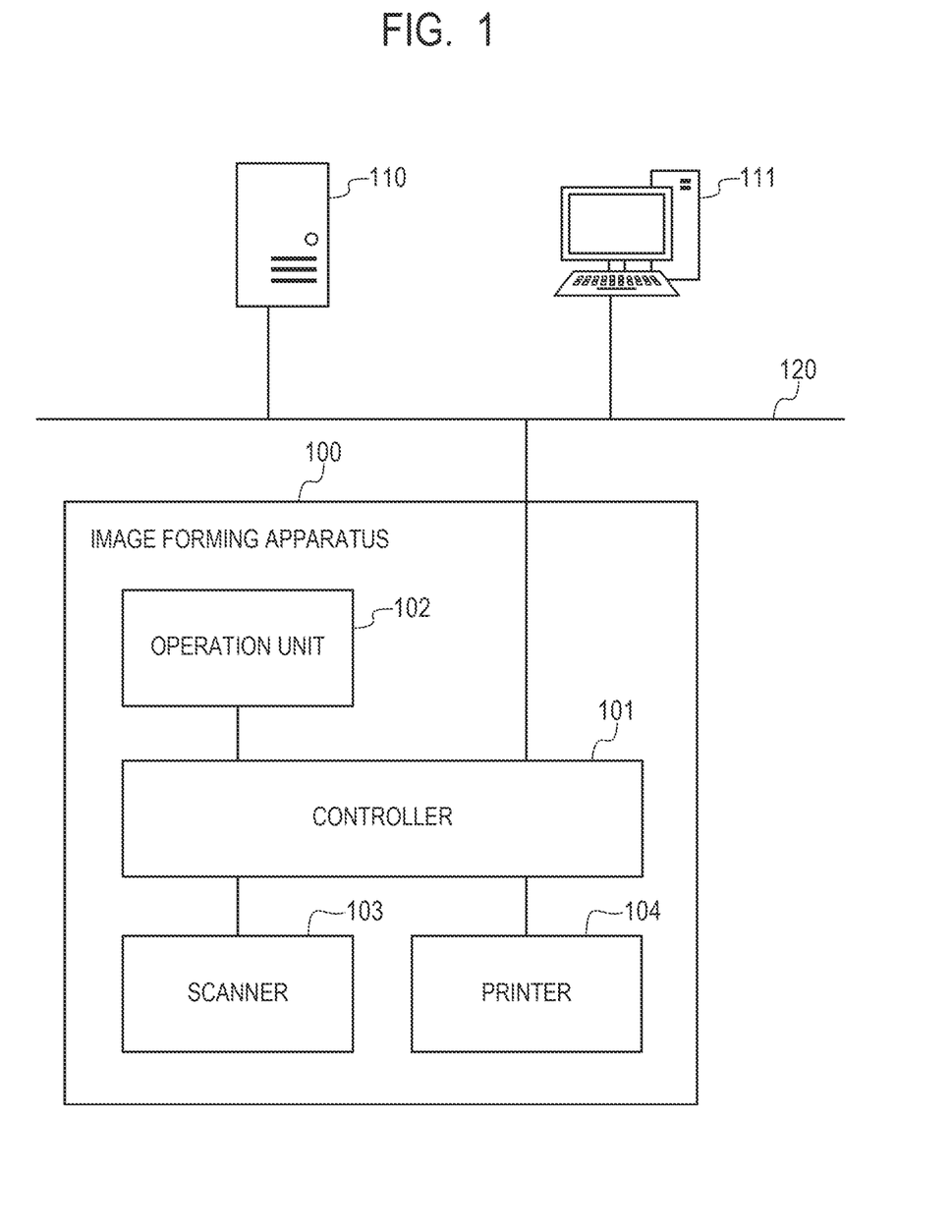
FIG. 1 is a diagram for describing a system configuration of an information processing system.

FIG. 1 is a diagram for describing a system configuration of an information processing system.

Incidentally, the present invention will be described hereinafter by taking an image forming apparatus as an example. However, the present invention may be applied to any information processing apparatus such as a copying machine, a fax machine, an MFP (multifunction peripheral) having a plurality of functions, or the like, wherein a plurality of electronic circuits or the like for which accuracy is required are provided and power is supplied to the circuits or the like.

An image forming apparatus 100 inputs, outputs, transmits and receives images and image data, and performs image processes related thereto. In the present invention, the image forming apparatus 100 is equipped with a controller 101, an operation unit 102 functioning as a user interface, a scanner 103 functioning as an image input device, and a printer 104 functioning as an image output device.

Each of the operation unit 102, the scanner 103 and the printer 104 is connected to the controller 101, so that the controller 101 controls the operation of each unit.

The controller 101, that is connected to a LAN (local area network) 120, communicates with a print server 110 and a client PC (personal computer) 111. A user creates a print job by the client PC 111 to print an image, and instructs a print process. As a result, the created print job is transferred to the image forming apparatus 100 via the print server 110 and the LAN 120.

Figure 2:
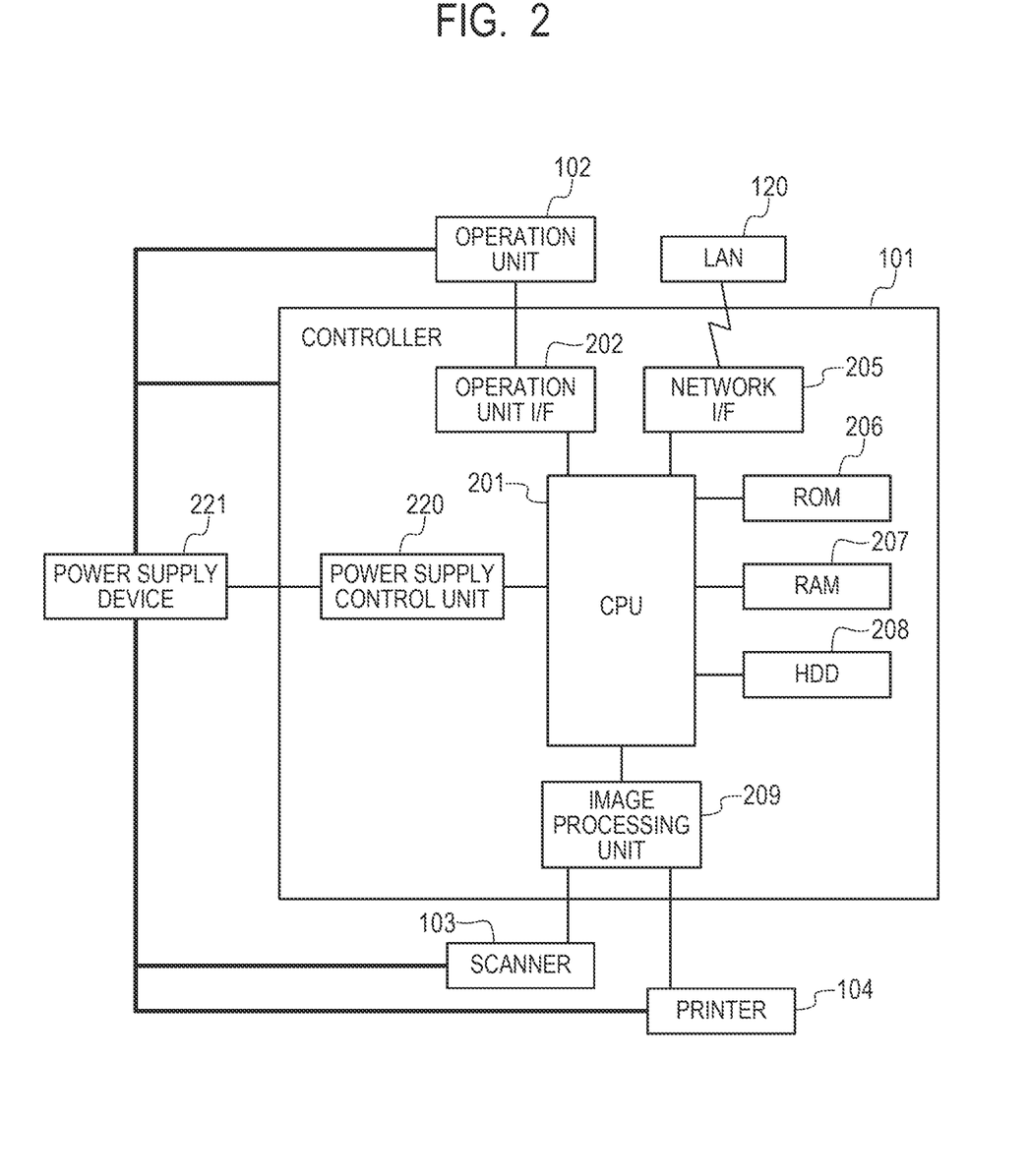
FIG. 2 is a diagram for describing a hardware constitution of an image forming apparatus.

Next, a hardware constitution of the controller 101 will be described with reference to FIG. 2.

The image forming apparatus 100 is equipped with the controller 101 that controls the image forming apparatus entirely.

Further, the controller 101 is equipped with a CPU 201 that performs main control.

The CPU 201 is connected to a ROM (read only memory) 206, a RAM (random access memory) 207 and an HDD (hard disk drive) 208 via system buses. Further, the CPU 201 is connected to a network I/F (interface) 205, an operation unit I/F 202 and an image processing unit 209. The ROM 206 is a boot ROM, and stores therein a boot program necessary for booting the information processing system. Here, the ROM 206 stores therein a boot program of the CPU 201.

The RAM 207 is a memory that can be read and written at any time for providing a work area as the main storage unit of the CPU 201. Also, the RAM is used as an image memory for temporarily storing therein image data to be internally processed.

The HDD 208, that is a non-volatile memory, stores therein an operating system, and programs of applications. Besides, the HDD stores therein setting value data, user data and the like that need to be retained even after a power supply of the image forming apparatus 100 is turned off. When the CPU 201 performs the processes based on the programs stored in the ROM 206, the HDD 208 and the like, the functions of the image forming apparatus 100 are realized.

The network I/F 205 is an interface that is used to connect to the LAN 120, and is used to input and output image data and device information to and from an external device via the LAN 120.

The operation unit I/F 202 is an interface that is used to input and output data and information to and from the operation unit 102 that is composed of a liquid crystal touch panel or the like. The CPU 201 outputs image data to be displayed to the operation unit 102 via the operation unit I/F 202. Besides, the operation unit I/F 202 is used to transfer the data input by the user via the operation unit 102 to the CPU 201.

The image processing unit 209 is connected to the scanner 103 and the printer 104 respectively. The image processing unit 209 performs image processes so as to correct, process and edit input image data read from the scanner 103. Besides, the image processing unit 209 performs processes such as a color conversion process, a filter process, a resolution conversion process and the like for print output image data to be output to the printer 104.

A power supply control unit 220 switches the on/off states of the power supply of each unit in accordance with operating states of the image forming apparatus 100. The power supply control unit 220 receives a control signal from the CPU 201 via the system bus. Then, based on the received control signal, the power supply control unit 220 transmits a control signal to a power supply device 221 that is a power supply means, thereby performing power feeding control.

The power supply device 221 receives power supply from a commercial power supply unit 301 (see FIG. 3), and supplies the power supply to each unit of the image forming apparatus 100 based on the control signal received from the power supply control unit 220. The power supply device 221 is always energized and can supply the power supply as long as the device is connected to the commercial power supply unit 301 via a power supply cable. Besides, the power supply device 221 is equipped with power supply circuits of a first power supply unit 302 and a second power supply unit 306 illustrated in FIG. 3 in order to supply DC power supply to each unit of the image forming apparatus 100.

Figure 3:
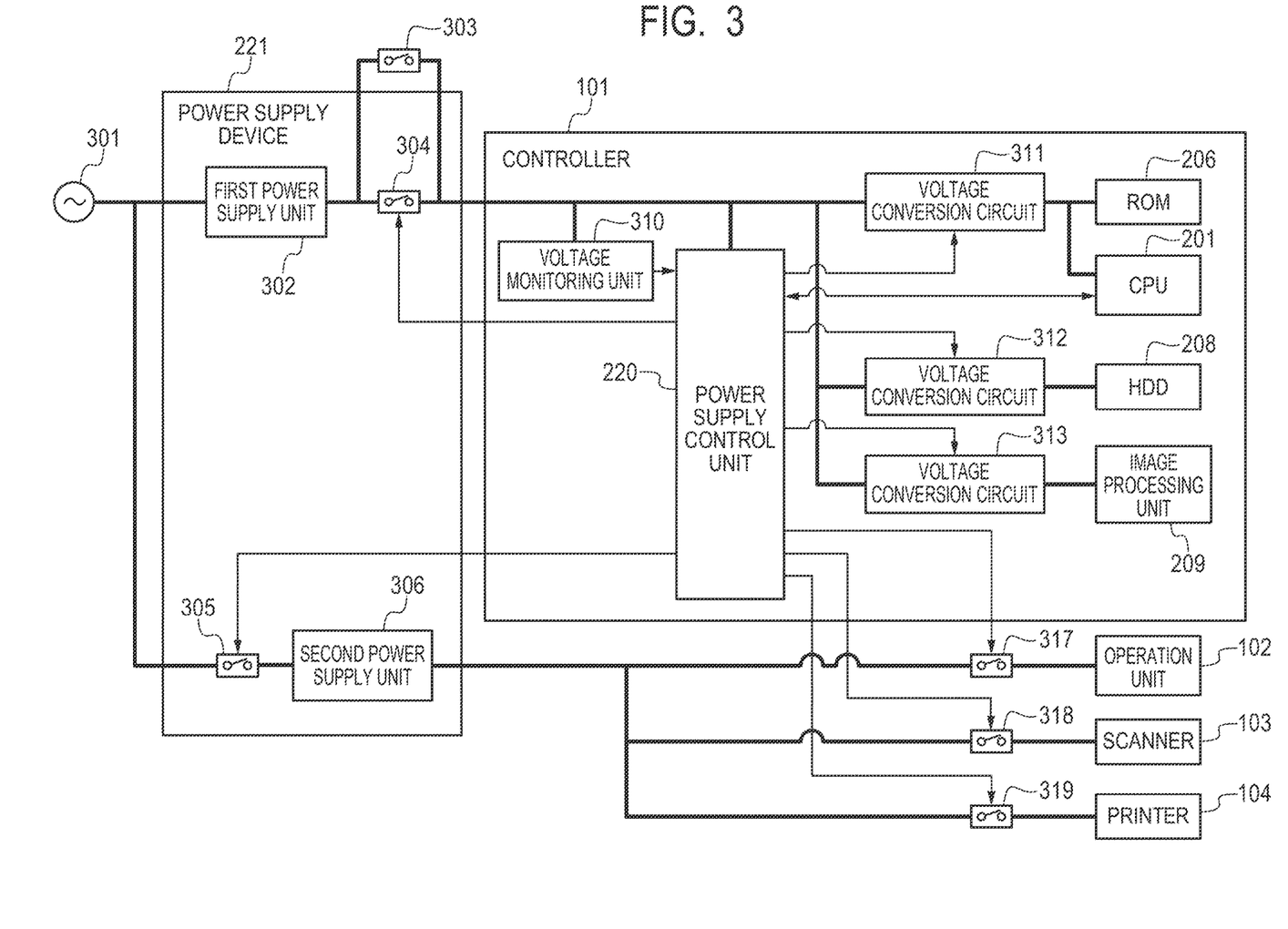
FIG. 3 is a diagram for describing a further hardware constitution of the image forming apparatus.

Subsequently, a constitution of the power supply device 221 of the image forming apparatus 100 and details of the power supply to each unit will be described with reference to FIG. 3.

The power supply device 221 is equipped with a main power supply switch 303. Here, the main power supply switch 303 is, for example, a seesaw switch. When the main power supply switch 303 is turned on by the user, the main power supply switch 303 comes to be in a conduction state, and the power supply generated by the first power supply unit 302 is supplied to the power supply control unit 220.

Besides, when the voltage of the DC power supply generated by the first power supply unit 302 exceeds a threshold value, a voltage monitoring unit 310 notifies the power supply control unit 220 that the power supply has been supplied. In response to the notification from the voltage monitoring unit 310 that the voltage of the DC power supply generated by the first power supply unit 302 exceeds a predetermined voltage value, the power supply control unit 220 turns on voltage conversion circuits 311, 312 and 313 and switches 317, 318 and 319. Here, the voltage conversion circuits 311, 312 and 313 convert the voltages of the power supply in accordance with the operation voltages of the CPU 201, the ROM 206, the HDD 208 and the image processing unit 209 connected in the subsequent stage. After that, the CPU 201 performs a booting process according to the boot program stored in the ROM 206, so that the image forming apparatus 100 transitions to a state capable of forming an image.

The image forming apparatus 100 includes a standby state and a power saving state.

In the standby state, the power supply device 221 supplies power supply to each of the controller 101, the operation unit 102, the scanner 103 and the printer 104. Besides, the CPU 201 transmits a control signal via the system bus at a time of transition to the standby state or at a time of transition to the power saving state, and rewrites a register value inside the power supply control unit 220. The power supply control unit 220 controls the on/off states of a switch 304, the voltage conversion circuits 311, 312 and 313, and the switches 317, 318 and 319, on the basis of the rewritten register value, and supplies power supply to each unit. In the standby state, the user can use the functions of the image forming apparatus 100, such as a scanning function, a printing function and the like.

In the power saving state, the power supply device 221 supplies power supply to the power supply control unit 220. Besides, the CPU 201 controls the power supply control unit 220 such that the power supply for a part of the controller 101 is enabled and the power supply for the operation unit 102, the scanner 103 and the printer 104 is disabled. The power supply control unit 220 turns off the voltage conversion circuits 312 and 313, and the switches 317, 318 and 319 in the power saving state, and stops the power supply. After that, the power supply control unit 220 reduces standby power of the second power supply unit 306, by turning off a switch 305 and further turning off the second power supply unit 306. In the power saving state, the image forming apparatus 100 transitions to the standby state by detecting button pressing of the operation unit 102 by the user, data reception from a network, and the like with use of the power supply control unit 220.

Next, a case where the image forming apparatus 100 is turned off will be described.

First, the user turns off and shuts off the main power supply switch 303. Here, in the standby state and the power saving state, since the switch 304 is on, the power supply of the controller 101 is not immediately turned off. After that, the CPU 201 detects that the main power supply switch 303 has been turned off, and thus controls the image forming apparatus 100 to be turned off. The CPU 201 terminates the application programs and stores the setting value data, the user data and the like. After that, the CPU 201 controls the power supply control unit 220 such that the power supply for the controller 101, the operation unit 102, the scanner 103 and the printer 104 is disabled. The power supply control unit 220 turns off the switch 304 connected to the power supply, the voltage conversion circuits 311, 312 and 313, and the switches 305, 317, 318 and 319, and stops the power supply.

Figure 4:
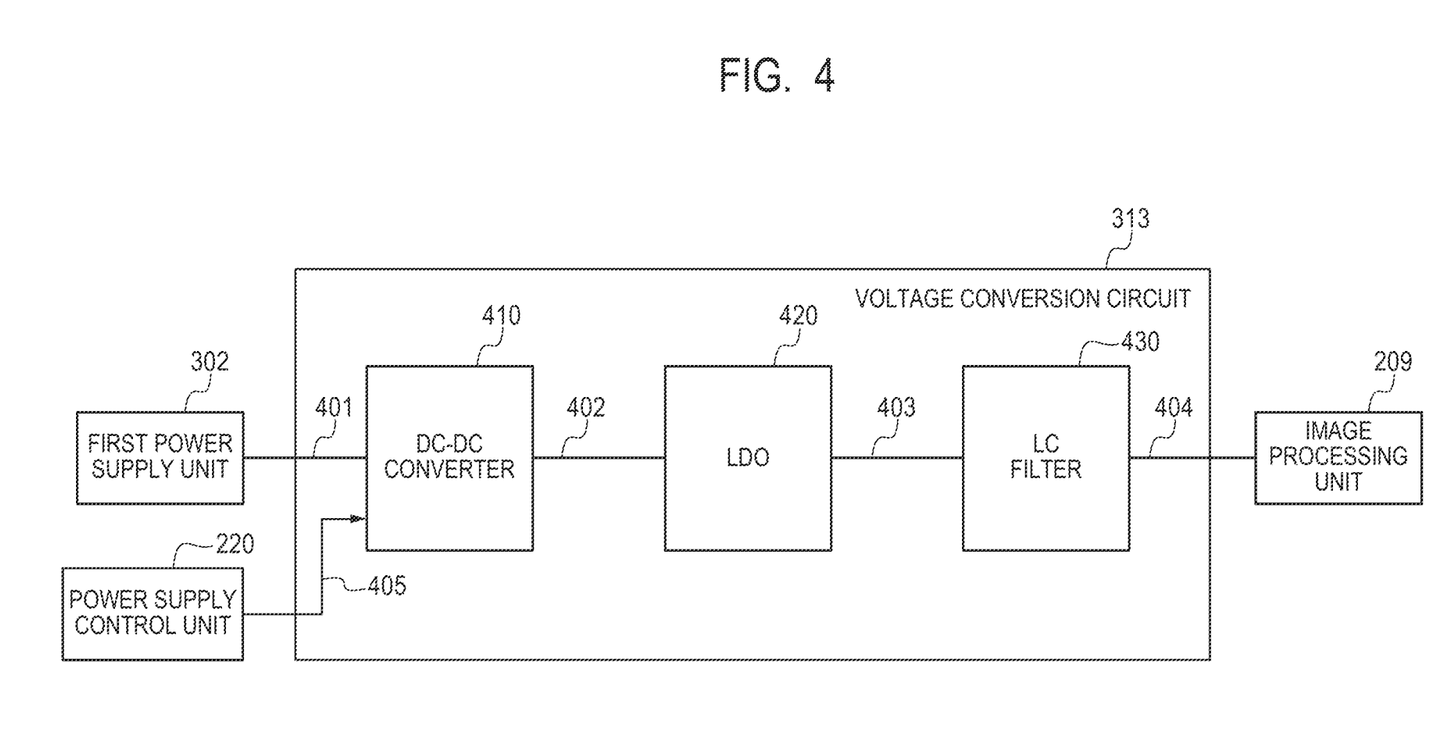
FIG. 4 is a diagram for describing a constitution of a voltage conversion circuit of the image forming apparatus.

Details of a constitution of the voltage conversion circuit will be described with reference to FIG. 4. Here, the voltage conversion circuit 313 that generates the power supply to be supplied to the image processing unit 209 will be described as an example.

The voltage conversion circuit 313 converts power supply 401 supplied from the first power supply unit 302 into an operation voltage of the image processing unit 209, at the same time reduces noise superimposed on the power supply, and generates power supply 404 that satisfies a voltage accuracy requirement of the image processing unit 209. The voltage conversion circuit 313 has a constitution in which a DC-DC converter 410, an LDO (Low Drop-Out) 420 and an LC filter 430 are connected in series. The power supply control unit 220 controls an enable signal 405 to switch on/off states of the DC-DC converter 410. In response to "ON" of the enable signal 405, the DC-DC converter 410 starts the voltage conversion of the power supply 401.

First, the power supply 401 is DC power supply that is generated by the first power supply unit 302, has the voltage value of, for example, 12 [V], and is supplied to the DC-DC converter 410. On the other hand, the power supply 404 corresponds to the operation voltage of the image processing unit 209, and this power supply has a low voltage such as 1.1 [V]. Here, if the voltage conversion is performed only by the LDO 420 without using the DC-DC converter 410, the conversion efficiency of the LDO 420 is determined by a ratio of an input voltage and an output voltage, so that the conversion efficiency of the power supply is low and power consumption increases. For this reason, the DC-DC converter 410 performs the voltage conversion such that the converted voltage is equal to or higher than the sum of the operation voltage of the image processing unit 209 and a step-down voltage (dropout voltage) of the LDO 420, and thus generates a power supply 402.

The power supply 402 is power supply of which the voltage has been converted by the DC-DC converter 410, has the voltage value of, for example, 1.8 [V], and is supplied to the LDO 420.

Next, the LDO 420 reduces noise during the operation of the DC-DC converter 410 and generates power supply 403 that is stepped down (dropped out) to the operation voltage of the image processing unit 209. Here, the LDO 420 has a ripple removal characteristic, and can reduce the noise superimposed on the power supply during the voltage conversion. Since the ripple removal characteristic has a frequency characteristic, and the ripple removal characteristic decreases as a frequency increases. For this reason, in order to reduce the operation noise of the DC-DC converter 410 superimposed on the power supply 402, the LDO 420 is configured such that the ripple removal characteristic is set to 20 [dB] or more in conformity with an operation frequency of the DC-DC converter 410, for example, 500 [kHz]. As a result, the operation noise of the DC-DC converter 410 that is superimposed on the power supply 402 can be reduced to ¹⁄₁₀ or less. The power supply 403 is power supply of which the voltage has been converted by the LDO 420, has the voltage value of, for example, 1.1 [V], and is supplied to the LC filter 430.

The LC filter 430 reduces high-frequency noise due to crosstalk and the like superimposed on the power supply 403, and supplies the power supply 404 to the image processing unit 209. Here, the high-frequency noise due to the crosstalk is a frequency that is even higher than the operation frequency of the DC-DC converter 410. The LC filter 430 is a low-pass filter that has an attenuation characteristic and reduces noise at a frequency equal to or higher than a cutoff frequency. Here, by setting the attenuation characteristic of the LC filter 430 in conformity with the frequency of the ripple removal characteristic of the LDO 420, noise from a low frequency to a high frequency can be reduced. For example, the low-pass filter is configured by setting the cutoff frequency of the LC filter 430 such that the attenuation characteristic is 30 [dB] or less, on the basis of the operation frequency of the DC-DC converter 410 of 500 [kHz]. As a result, the high-frequency noise that is superimposed on the power supply 403 can be reduced to ¹⁄₃₀ or less. By generating the power supply 404 in which the noise from the low frequency to the high frequency has been reduced by the voltage conversion circuit 313, it is possible to satisfy an accuracy requirement of the operation voltage of the image processing unit 209.

Figure 5:
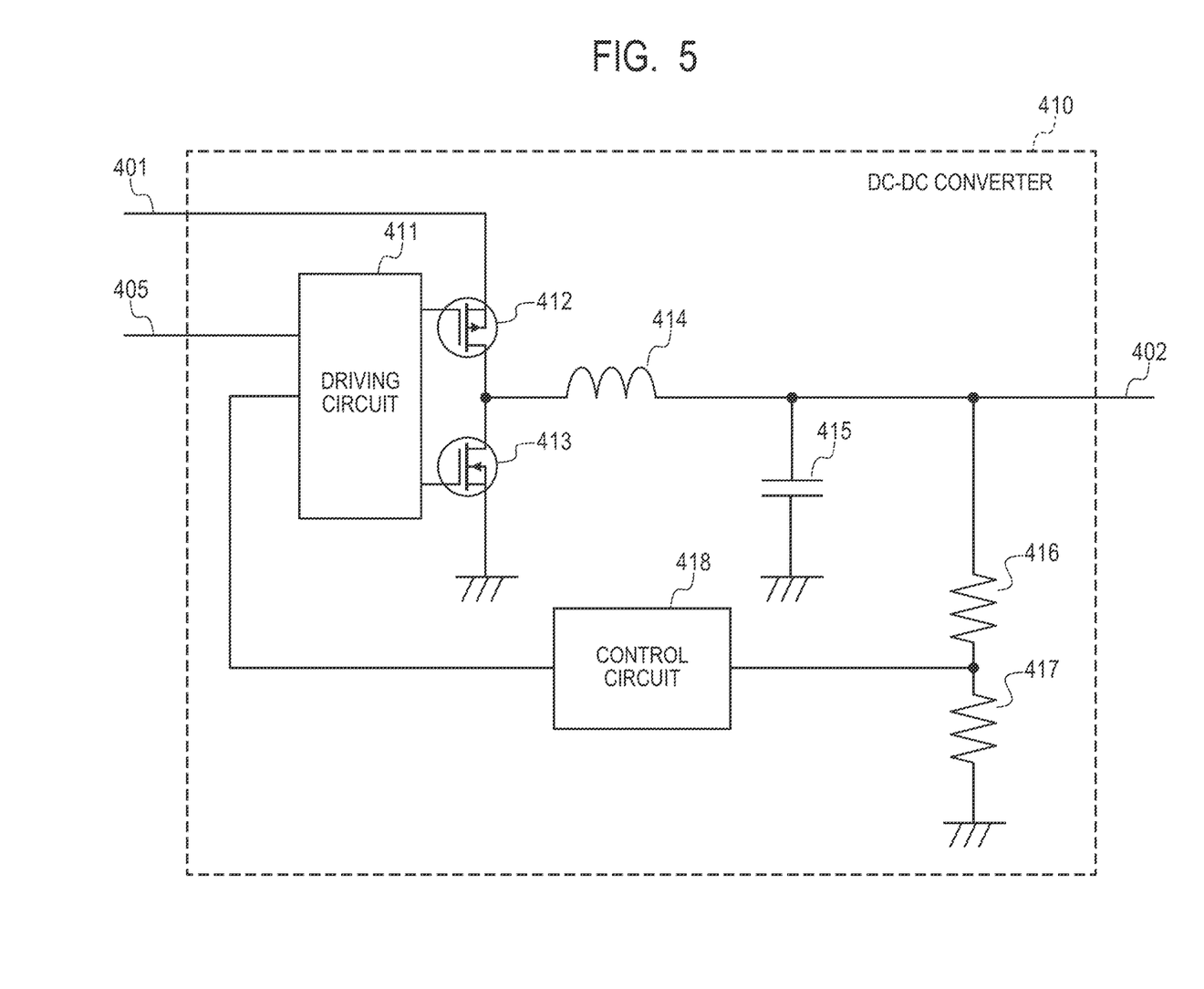
FIG. 5 is a diagram for describing a constitution of a DC-DC converter that constitutes the voltage conversion circuit.

A constitution of the DC-DC converter 410 will be described with reference to FIG. 5. The DC-DC converter 410 converts the voltage of the power supply 401 and generates the power supply 402.

A driving circuit 411 receives a PWM (pulse-width modulation) control signal from a control circuit 418, and controls operations of FETs (field-effect transistors) 412 and 413 based on the received signal. Besides, the driving circuit 411 switches the on/off states of the DC-DC converter 410 based on the enable signal 405.

The FETs 412 and 413 operate by the driving circuit 411 and convert the power supply 401 on the input side into pulse signals. After that, the pulse signals output from the FETs 412 and 413 are smoothed by an LC filter that is composed of an inductor 414 and a capacitor 415, and the power supply 402 is generated.

Feedback resistors 416 and 417 divide the voltage value of the power supply 402 on the output side, and input the obtained voltage values to the control circuit 418.

The control circuit 418 generates the PWM control signal for controlling the operations of the FETs 412 and 413 from the voltage values input from the feedback resistors 416 and 417. When the voltage of the power supply 402 on the output side drops, the control circuit 418 outputs the PWM control signal so as to widen the width of the pulse signal. On the other hand, when the voltage of the power supply 402 rises, the control circuit 418 outputs the PWM control signal so as to narrow the width of the pulse signal. As a result, the control circuit 418 performs control such that the power supply 402 on the output side of the DC-DC converter 410 becomes constant.

Figure 6:
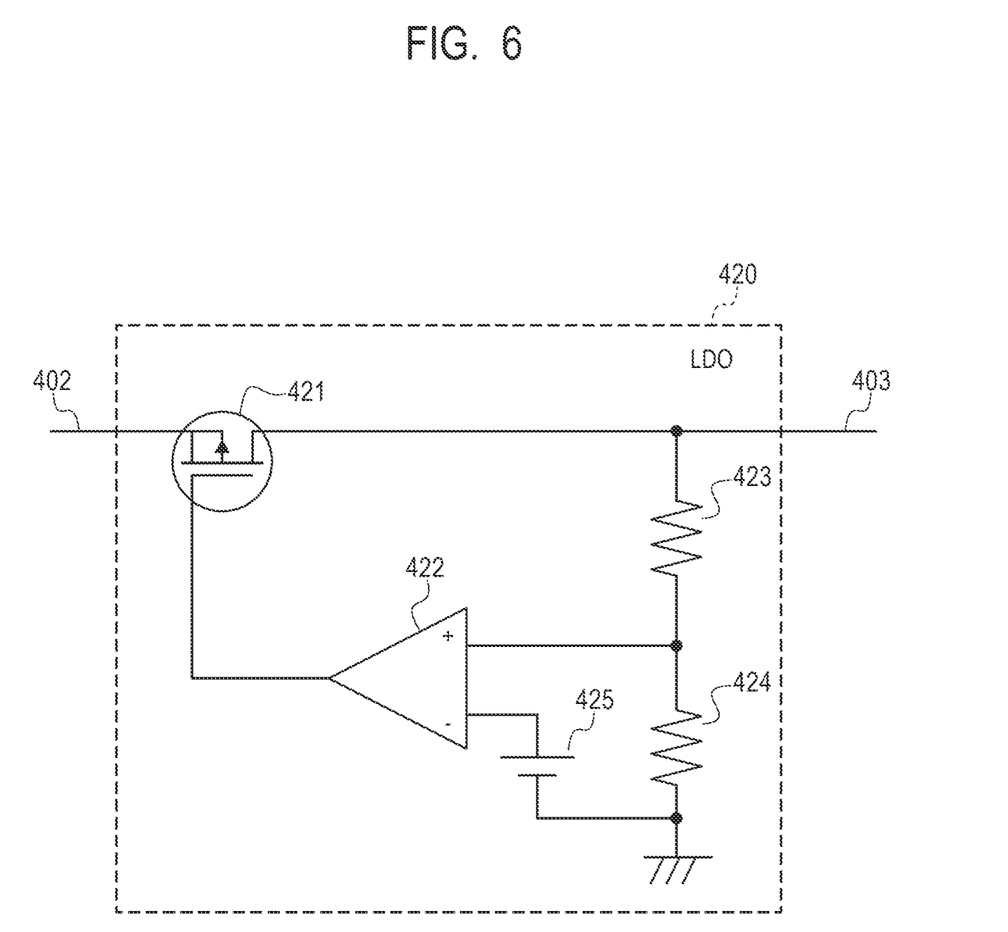
FIG. 6 is a diagram for describing a constitution of an LDO that constitutes the voltage conversion circuit.

A constitution of the LDO 420 will be described with reference to FIG. 6.

The LDO 420 generates the power supply 403 in which the voltage value of the power supply 402 has been converted into the operation voltage of the image processing unit 209.

An FET 421 is connected between the power supply 402 on the input side and the power supply 403 on the output side, is controlled by the output of an error amplifier 422, and operates such that the voltage value of the power supply 403 becomes constant.

The error amplifier 422 compares reference voltage supply 425 with the voltage value obtained by dividing the power supply 403 on the output side by feedback resistors 423 and 424, and controls the FET 421 so as to retain the power supply voltage constant based on the comparison result.

The feedback resistors 423 and 424 divide the voltage value of the power supply 403 on the output side, and input the obtained voltage values to the error amplifier 422.

The reference voltage supply 425 always outputs a constant voltage value, and is a reference voltage supply with respect to a comparison target of the error amplifier 422. The reference voltage supply 425 may be configured by a well-known circuit in which a constant voltage element, for example, a Zener diode or the like is used.

In the operation of LDO 420, first, when the voltage of the power supply 403 on the output side drops, the error amplifier 422 performs control such that the on-resistance of the FET 421 becomes small. Thus, since the voltage drop of the FET 421 decreases, the voltage of the power supply 403 rises. On the other hand, when the voltage of the power supply 403 rises, the error amplifier 422 performs control such that the on-resistance of the FET 421 becomes large. Thus, since the voltage drop of the FET 421 increases, the voltage of the power supply 403 drops. As a result, the power supply 403 on the output side of the LDO 420 is controlled to be constant.

Figure 7:
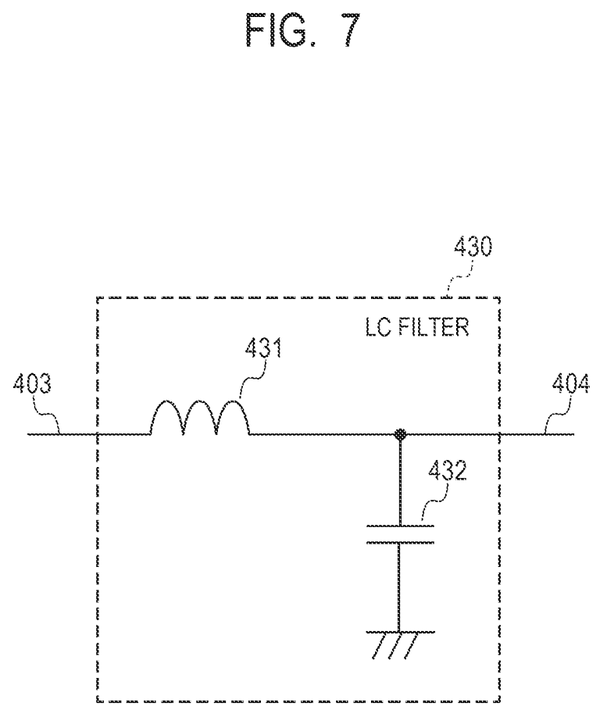
FIG. 7 is a diagram for describing a constitution of an LC filter that constitutes the voltage conversion circuit.

A constitution of the LC filter 430 will be described with reference to FIG. 7. In the LC filter 430, an inductor 431 and a capacitor 432 are combined with each other to constitute a circuit for reducing the noise in the power supply 403. For this reason, the inductor 431 is connected in series between the power supplies 403 and 404 and the capacitor 432 is connected between the power supplies 404 and GND, so as to constitute the low-pass filter for cutting the high-frequency signals. The cutoff frequency of the low-pass filter is set based on the operation frequency of the DC-DC converter 410 and the ripple removal characteristic of the LDO. As a result, an effect of reducing the high-frequency noise can be obtained.

As described above, in the power supply circuit that generates the power supply of the electronic circuit constituting the image forming apparatus 100, it is possible mainly by the LDO to reduce the noise of the DC-DC converter superimposed on the power supply voltage, and it is also possible by the LC filter to reduce the high-frequency noise due to the crosstalk. As a result, it possible to generate the power supply voltage that satisfies the voltage accuracy requirement of the power supply to be supplied to the electronic circuit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-000690, filed Jan. 7, 2020, which is hereby incorporated by reference herein in its entirety.

What is claimed is:

1. A voltage conversion circuit configured to supply power to an electronic circuit, the voltage conversion circuit comprising:
 a DC-DC converter configured to perform voltage conversion for a DC power supply;
 an LDO configured to step down and to remove a ripple; and
 a low-pass filter configured to reduce noise,
 wherein the DC-DC converter, the LDO, and the low-pass filter are connected in series, and
 wherein a cut-off frequency of the low-pass filter is higher than a cut-off frequency of the LDO.

2. The voltage conversion circuit according to claim 1, wherein a ripple removal characteristic of the LDO is set based on an operation frequency of the DC-DC converter.

3. The voltage conversion circuit according to claim 1, wherein the cut-off frequency of the low-pass filter is set based on an operation frequency of the DC-DC converter.

4. The voltage conversion circuit according to claim 1, wherein the low-pass filter is configured to reduce high-frequency noise that has not been removed by the LDO.

5. The voltage conversion circuit according to claim 1, wherein the low-pass filter is an LC filter.

6. The voltage conversion circuit according to claim 1, wherein:
 the LDO reduces noise from the DC-DC converter, and
 the low-pass filter reduces noise from crosstalk.

7. An image forming apparatus comprising:
 an electronic circuit; and
 a voltage conversion circuit configured to supply power to the electronic circuit, and comprising:
  a DC-DC converter configured to perform voltage conversion for a DC power supply;

an LDO configured to step down and to remove a ripple; and a low-pass filter configured to reduce noise, wherein the DC-DC converter, the LDO, and the low-pass filter are connected in series, and wherein a cut-off frequency of the low-pass filter is higher than a cut-off frequency of the LDO.

8. The image forming apparatus according to claim 7, wherein the electronic circuit comprises one of an image processing unit, a hard drive, a processor, or a memory.

* * * * *